(12) United States Patent
Wallace (10) Patent No.: US 8,468,672 B2
(45) Date of Patent: Jun. 25, 2013

(54) SURFACE SENSING DEVICE (75) Inventor: David Sven Wallace, Nympsfield (GB)

(73) Assignee: Renishaw PLC, Wotton-Under-Edge (GB)

( * ) Notice: Subject to any disclaimer, the term of this patent is extended or adjusted under 35 U.S.C. 154(b) by 257 days.

(21) Appl. No.: 12/867,623

(22) PCT Filed: Mar. 5, 2009

(86) PCT No.: PCT/GB2009/000618
§ 371 (c)(1),
(2), (4) Date: Aug. 13, 2010

(87) PCT Pub. No.: WO2009/109764
PCT Pub. Date: Sep. 11, 2009

(65) Prior Publication Data
US 2010/0325863 A1  Dec. 30, 2010

(30) Foreign Application Priority Data
Mar. 5, 2008  (GB) .................................. 0804114.7

(51) Int. Cl.
*B23Q 17/00* (2006.01)
*B23P 19/00* (2006.01)

(52) U.S. Cl.
USPC ........................................ 29/407.06; 29/729

(58) Field of Classification Search
USPC ................. 29/407.05, 428, 729; 33/503, 502, 33/504, 556
See application file for complete search history.

(56) References Cited

U.S. PATENT DOCUMENTS

| | | |
|---|---|---|
| 3,727,119 A | 4/1973 | Stanley et al. |
| 4,567,672 A | 2/1986 | Honda et al. |
| 4,888,877 A | 12/1989 | Enderle et al. |
| 5,410,817 A | 5/1995 | Kish |
| 5,757,496 A | 5/1998 | Yamazaki |
| 5,848,477 A | 12/1998 | Wiedmann et al. |
| 5,918,378 A | 7/1999 | McMurtry et al. |
| 6,430,828 B1 | 8/2002 | Ulbrich |
| 7,227,647 B2 | 6/2007 | Ferger |
| 2003/0177653 A1 | 9/2003 | Granger |
| 2006/0010701 A1 | 1/2006 | Jordil et al. |

FOREIGN PATENT DOCUMENTS

| | | |
|---|---|---|
| EP | 0 392 660 A2 | 10/1990 |
| EP | 0 523 906 A1 | 1/1993 |
| EP | 0 503 032 B1 | 4/1995 |

(Continued)

OTHER PUBLICATIONS

Written Opinion of the International Searching Authority dated Aug. 5, 2009 in International Application No. PCT/GB2009/000618.

(Continued)

*Primary Examiner* — John C Hong
(74) *Attorney, Agent, or Firm* — Oliff & Berridge, PLC (57) ABSTRACT

A method for orienting a surface sensing device (SSD) uses an apparatus having a support attachable to a moveable arm of a machine, such as a coordinate measuring apparatus. The support includes a first member rotatable about a first axis of rotation and a SSD for sensing the surface of a workpiece; the SSD is releasably connectable to the first member for rotation therewith. The method includes the steps of disconnecting a SSD from a support, the SSD being connected to the support in a first orientation; rotating one of the SSD and the support relative to the other of the SSD and the support and reconnecting the SSD and the support into a second orientation. An apparatus for orienting a surface sensing device is further described.

21 Claims, 10 Drawing Sheets

FOREIGN PATENT DOCUMENTS

| | | |
|---|---|---|
| EP | 0 683 378 A2 | 11/1995 |
| EP | 0 916 922 A2 | 5/1999 |
| EP | 0 916 923 A2 | 5/1999 |
| EP | 1 659 363 A1 | 5/2006 |
| EP | 1 783 454 A1 | 5/2007 |
| GB | 2 047 133 A | 11/1980 |
| GB | 2 281 779 A | 3/1995 |
| WO | WO 02/101329 A1 | 12/2002 |
| WO | WO 03/008905 A1 | 1/2003 |
| WO | WO 2006/082368 A2 | 8/2006 |
| WO | WO 2008/029094 A1 | 3/2008 |

OTHER PUBLICATIONS

British Search Report dated Jun. 17, 2008 in British Patent Application No. GB0804114.7.
International Search Report dated Aug. 5, 2009 in International Application No. PCT/GB2009/000618.
Feb. 14, 2012 Office Action issued in Chinese Patent Application No. 200980107792.X (with translation).
Nov. 2, 2012 Office Action issued in Chinese Patent Application No. 200980107792.X (with translation).

SURFACE SENSING DEVICE

The present invention relates to a surface-sensing device for use in position determining apparatus such as, for example, a co-ordinate-measuring machine (CMM), a scanning machine, a machine tool or an inspection/measurement robot.

Such a position determining apparatus (see for example U.S. Pat. No. 3,727,119 which describes a CMM) is used for measuring a workpiece, and typically comprises an arm moveable in three directions x,y,z relative to a table on which the workpiece is supported. Movement of the arm in each of the directions x,y,z is measured by transducers on the machine, and a probe provided on the arm produces a signal indicating the relationship between the workpiece surface to be measured, and the arm. The position of the surface may thus be determined.

In an alternative apparatus, for example some types of machine tool, the table moves in x and y and the arm moves in z.

It is known to provide scanning probe apparatus, secured to a co-ordinate-measuring machine, as described in the US patent publication no. US2006/0010701. Such a scanning probe apparatus comprises a probe head, which is rotatable about two mutually perpendicular axes relative to a fixed structure, and a probe assembly including a stylus. In use, the head is mounted on the arm of the machine with one of its axes aligned with the axis of the arm. Transducers associated with each of the rotatable axes of the head determine the orientation of the axis of the probe assembly relative to the axis of the arm of the machine.

Another example of a known probe head is the Renishaw PH9. The PH9 is a two-axis motorised probe head, which orients a probe by means of two serially connected rotors. Each of the rotors may occupy one of a plurality of kinematic rest locations equispaced about its axis of rotation. EP 0392660 relates to a manually operable version of this probe head for use on machines which do not have computer control.

It is often desirable, in order to perform different types of measurement operation, to exchange one probe assembly for another during or between scanning operations. This can be done by removing a kinematically mounted probe from a two axis probe head and replacing it with another probe having a kinematic mount. A more repeatable method for exchanging probes is described in EP0523906 where the probe head comprises a support, and a rotor assembly which carries a probe, the rotor assembly being removeably mounted to the support. The rotor is removable, such that the exchange of one probe for another is achievable. The rotor is also indexable to provide rotation of the probe relative to the support.

When performing a scanning operation using a probe mounted on a probe head the machine and/or the probe head cause the stylus tip to move over the surface of the workpiece, in accordance with instructions from a machine controller, to gather data about the workpiece surface. From the signals provided by the measuring transducers of the machine and probe head, and from the knowledge of the dimensions of the surface sensing device, a prediction can be made about the position of the stylus tip (and therefore of the position of the surface). A typical workpiece may be for example a car engine block, which has numerous holes at a variety of angles. It is desirable to obtain information from the entire surface of the workpiece; therefore the stylus must be able to reach all of the surfaces.

Many probes, for example those with ball styli such as touch trigger probes, are multi-directional; this means that they are able to sense a workpiece in a number of directions. Some probes however are uni-directional, such as optical probes and surface finish probes; this means they are only able to sense a workpiece in one direction, limiting the number of surfaces they can reach.

Due to the varying shapes of the workpiece, and the physical dimensions and limitations of the probe head movement, the stylus tip is sometimes unable to reach the surface of the workpiece. Thus, information about the profile of the surface cannot be obtained.

A first aspect of the present invention provides a method for orienting a surface sensing device using apparatus comprising a support attachable to a moveable arm of a machine, the support comprising a first member rotatable about a first axis of rotation, a surface sensing device for sensing the surface of a workpiece, the surface sensing device being releasably connectable, directly or indirectly, to the first member for rotation therewith, characterised in that the method comprises the following steps:

disconnecting the surface sensing device from the support, said surface sensing device being connected to the support in a first orientation;

rotating one of the surface sensing device and the support relative to the other of the surface sensing device and the support;

reconnecting the surface sensing device and the support into a second orientation.

Preferably the step of disconnecting the surface sensing device from the support comprises holding the surface sensing device in a holder.

More preferably the moveable arm of the machine moves the surface sensing device into the holder.

Rotation of the first member of the support about the first axis of rotation is conveniently actuated by a first motor.

Preferably, rotation of one of the surface sensing device and the support relative to the other of the surface sensing device and the support is about the first axis and is effected by the first motor.

Alternatively, rotation of one of the surface sensing device and the support relative to the other of the surface sensing device and the support may conveniently be effected by a rotator on the holder.

Advantageously the step of reconnecting the support and the surface sensing device comprises moving the moveable arm of the machine such that the support is brought into connection with the surface sensing device.

Conveniently, the method further comprises the step of measuring the surface of a workpiece.

More conveniently, measuring the surface of a workpiece comprises scanning the surface of the workpiece.

The method is particularly advantageous when the surface sensing device senses in a restricted number of directions, such as a unidirectional probe.

Preferably the surface sensing device is a surface finish probe.

A second aspect of the present invention provides apparatus for orienting a surface sensing device comprising:

a support attachable to a moveable arm of a machine;

the support comprising a first member rotatable about a first axis of rotation; and     a surface sensing device for sensing the surface of a workpiece;

the surface sensing device being releasably connectable, directly or indirectly, to the first member for rotation therewith;

characterised in that the surface sensing device is connectable to the first member in at least two relative rotational orientations.

Advantageously the surface sensing device is disconnectable from a first rotational orientation relative to the support and reconnectable in a second rotational orientation relative to the support.

Conveniently electrical contacts, for relaying electrical signals from the surface sensing device to the support in the at least two rotational orientations of the surface sensing device with respect to the support, are provided on both the surface sensing device and the support.

Advantageously, the electrical contacts comprise concentric rings of electrical contact material on at least one of the surface sensing device and the support; and more advantageously the electrical contacts also comprise pins of electrical contact material on the other of the surface sensing device and the support.

The electrical contact material advantageously comprises a gold plated substrate. Such a substrate may be, for example, copper or brass.

Conveniently, rotation of the first member of the support about the first axis of rotation is actuated by a first motor.

Advantageously the support additionally comprises a second member rotatable relative to the first member about a second axis of rotation, wherein said axis of rotation is transverse to the first axis of rotation.

Advantageously the apparatus additionally comprises a holder for holding the surface sensing device. More advantageously said holder holds the surface sensing device when it is disconnected from the support.

Preferably the holder comprises holding means which assist in disconnecting the surface sensing device from the support. The holding means may be, for example, a lip which cooperates with a groove on the surface sensing device.

Conveniently the surface sensing device is releasably attached to the support by attachment means comprising at least one magnet on one of the support and the surface sensing device and at least one magnetic material on the other of the support and the surface sensing device.

Preferably the surface sensing device has a substantially longitudinal axis. In some embodiments the surface sensing device senses a surface in a direction transverse to or offset from its substantially longitudinal axis. In other embodiments the surface sensing device may sense, for example parallel to the substantially longitudinal axis of the surface sensing device.

The surface sensing device may be a contact probe, or a non-contact probe. Non-contact probes include for example optical probes, capacitive probes, and inductive probes.

Conveniently the surface-sensing device comprises a probe body, a stylus, and a stylus tip.

Advantageously the surface-sensing device comprises a surface finish probe. Alternatively the surface sensing device may comprise, for example, a laser spot probe or a laser line probe.

Preferred embodiments of the invention will now be described by way of example and with reference to the accompanying drawings, wherein:

FIG. 6b shows a plan view of the probe change port shown in FIG. 6a;

Figure 1:
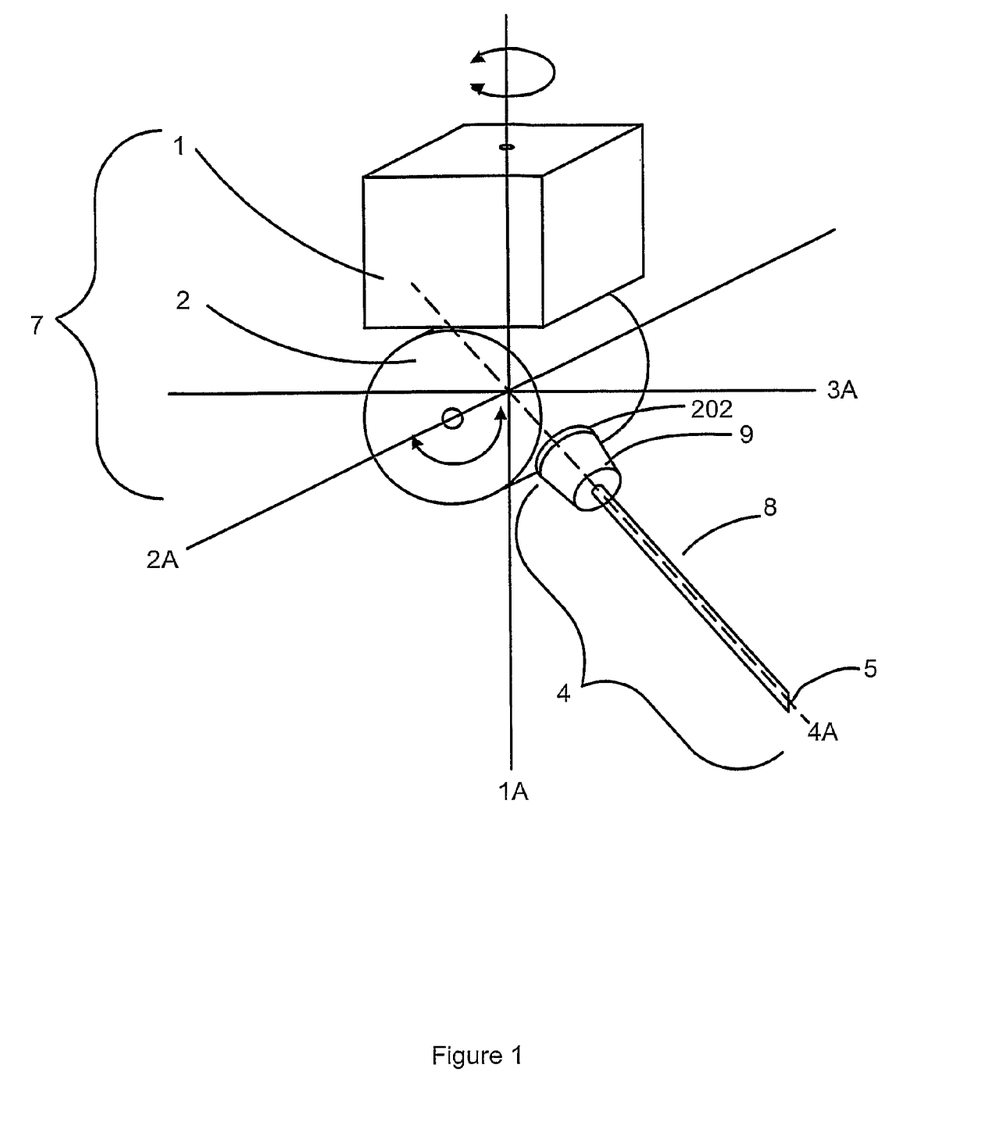
FIG. 1 shows an isometric view of a surface sensing device attached to an articulating probe head.

Referring to FIG. 1 a co-ordinate system in a co-ordinate-positioning machine can be defined by three mutually orthogonal axes, 1A, 2A and 3A, whereby in use 1A is substantially vertical and 3A is substantially horizontal. If axis 1A is taken to lie at 0 degrees in the plane of the paper, movement from said 0 degrees position to a 90 degrees position, also in the plane of the paper, can be brought about by rotation in an anticlockwise direction about an axis 2A.

FIG. 1 shows, in three dimensions, a surface sensing device 4 mounted on a support 7. In use the support 7, an articulating probe head, is attached to the moveable arm of a coordinate-positioning machine for movement therewith. The support comprises a first housing member 1 rotatable about the axis 1A, and a second housing member 2 rotatable about the axis 2A. The first housing member is attachable at one end to the moveable arm of a machine and at another end to a near end of the second housing member 2. At its distal end the second housing member 2 has an attachment portion 202. Attached to the attachment portion 202 of the second housing member 2 for rotation therewith is a surface sensing device, in this case a surface finish probe 4. The surface sensing device 4 extends along an axis 4A, transverse to and intersecting axis 2A. The surface finish probe 4 comprises a probe body 9, a stylus 8, and a stylus tip 5.

Figure 2:
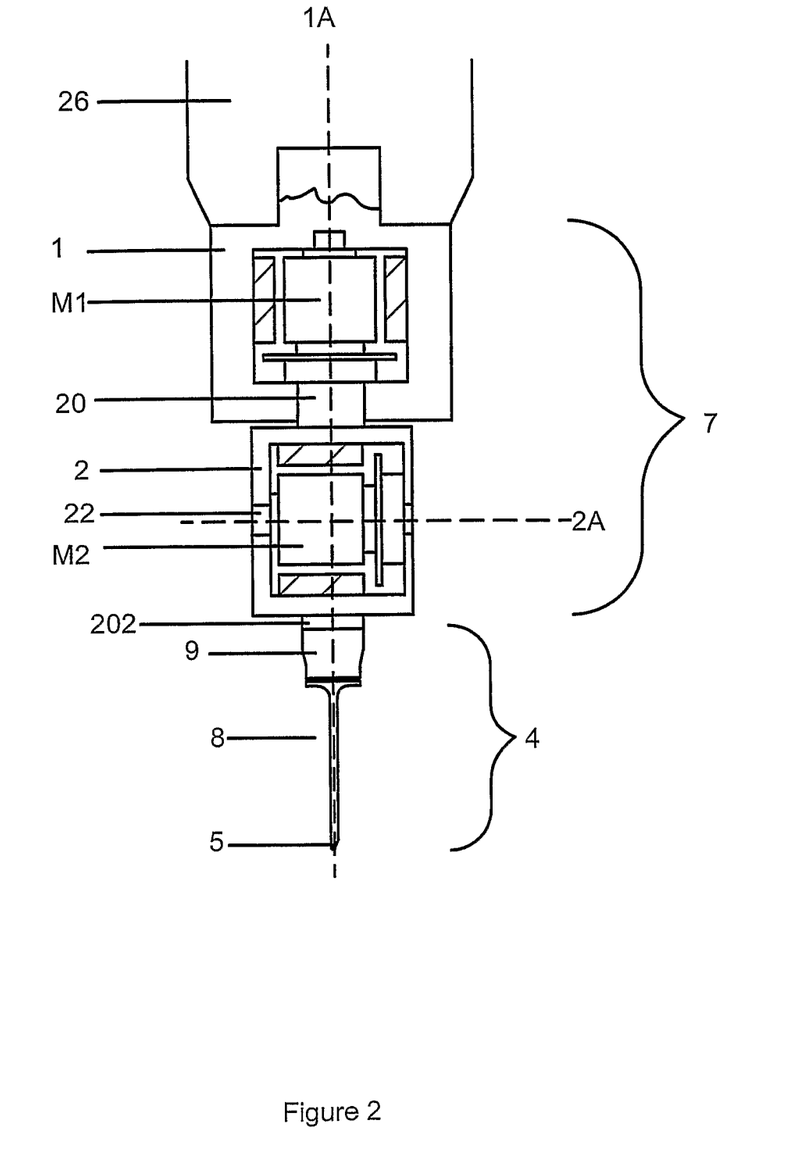
FIG. 2 shows a section through the device in a plane defined by axes 1A and 2A in FIG. 1.

FIG. 2 shows a section through the support 7 and the surface sensing device 4 in a plane defined by axes 1A and 2A of FIG. 1. The first housing member 1, adapted for attachment to a position determining apparatus 26 (for example the arm of a CMM), houses a motor M1 for effecting angular displacement of a first shaft 20 about a first axis 1A. Attached to the first shaft 20 is the second housing member 2, which houses a motor M2 for effecting angular displacement of a second shaft 22 about a second axis 2A. Attached to the second shaft 22 for rotation therewith is a surface-sensing device 4 such as a surface-sensing probe.

Figure 3:
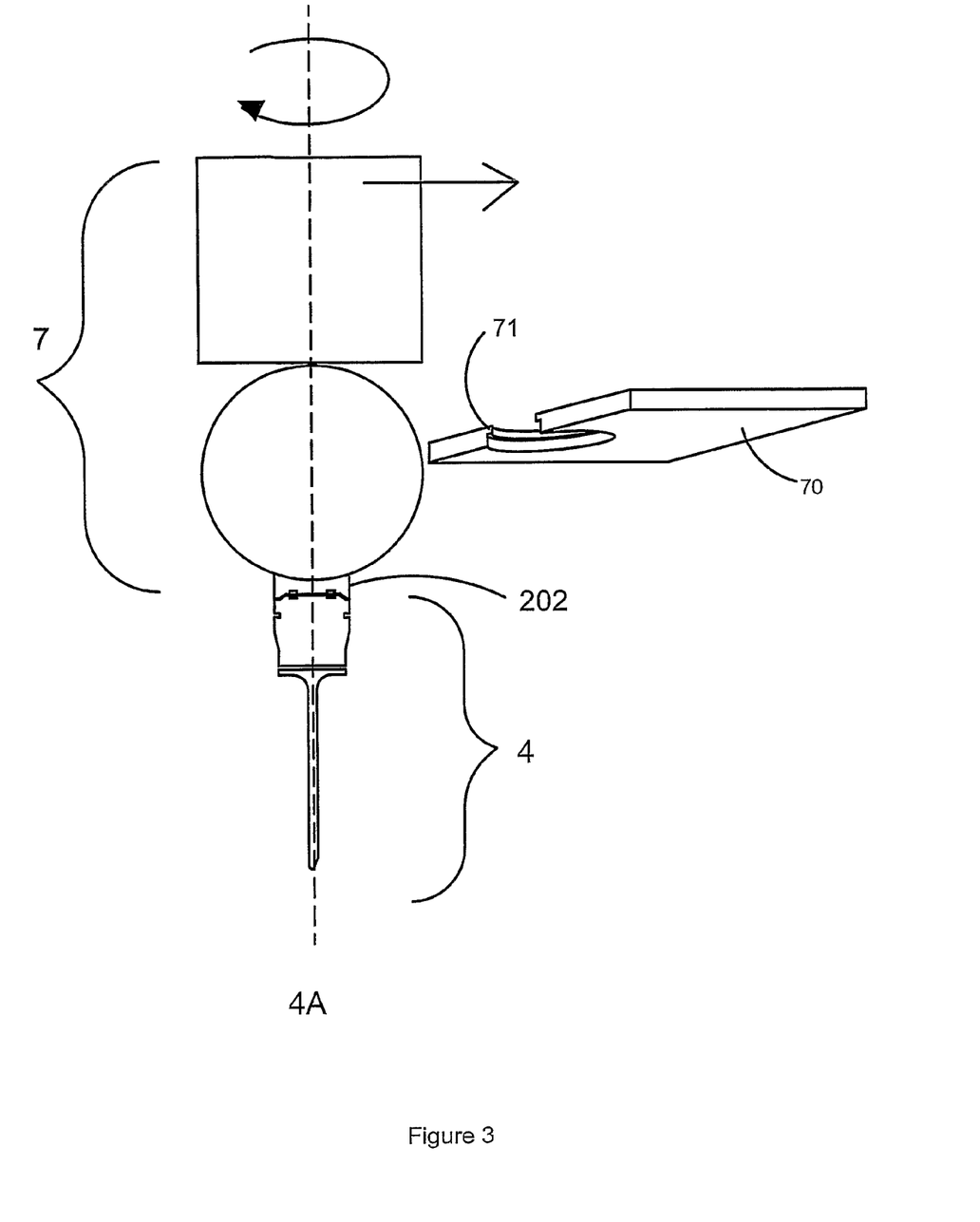
FIG. 3 shows an underside view of a probe change-port and a side view of a surface sensing device mounted on an articulating probe head.

FIG. 3 shows an underside view of a probe change-port 70 having a lip 71 around the periphery of its probe receiving port, and a front view of a surface sensing probe 4 mounted on an articulating probe head 7 as described previously.

Figure 4:
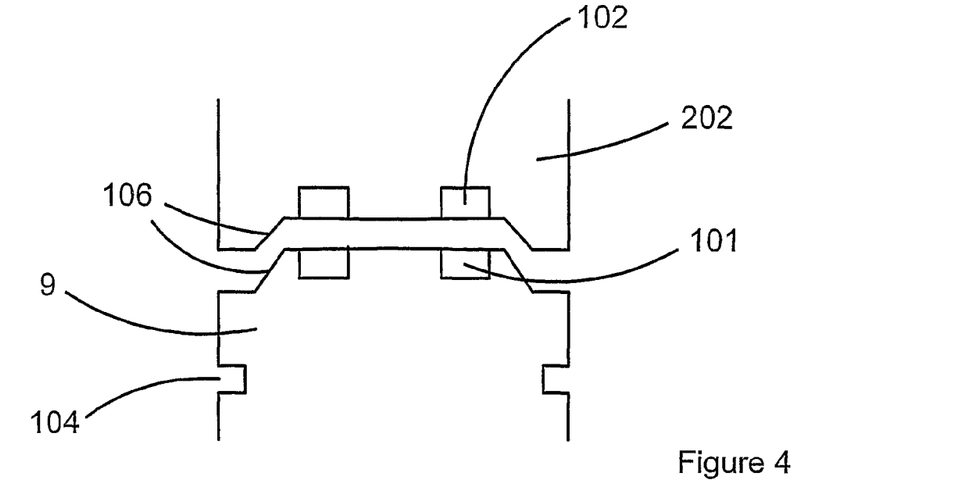
FIG. 4 shows a cross section through the attachment portion of the support and the surface sensing device.

FIG. 4 shows a cross section through the attachment portion 202 of the support, and the probe body 9. The attachment portion 202 of the support 7 is provided with a ring of magnetic material 102, such as a ferrous material. The magnetic material 104 is arranged so as to cooperate with magnets 101 provided on the probe body 9; the magnets 101 and magnetic material 102 attach the surface sensing device to the attachment portion 200 of the second member 2 of the support 7. As can be seen from the figure the connecting surfaces of both the support and the surface sensing device have chamfered edges 106 to aid alignment when the arm of the machine engages (and re-engages) the support 7 and the probe body 9.

Alternatively the attachment means for attaching the surface sensing device to the support may be, for example, a locking cam joint.

Figure 5A:
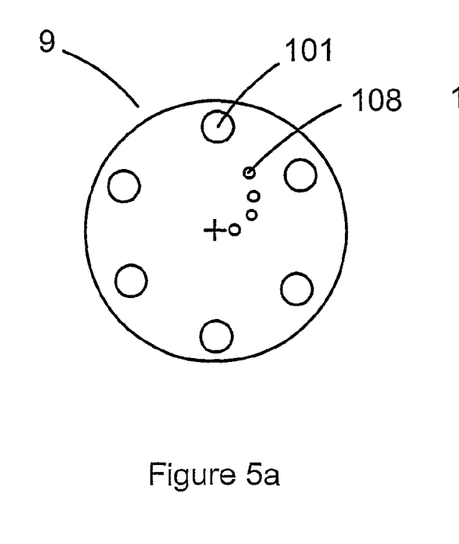
FIG. 5a shows a plan view of the attachment means and electrical connections provided on the surface sensing device.

FIG. 5a shows a plan view of the attachment means and electrical connection means provided on the surface sensing device. The figure shows the circular cross-section of the connecting surface of the probe body 9. Six magnets 101 are spaced around the circumference of the connecting surface for engaging with the magnetic material on the attachment portion 202 of the support 7. Spring loaded electrical connector pins 108, also provided on the connecting surface of the probe body 9, are arranged in a spiral formation about the centre of the circular connecting surface, so as to connect with the electrical connections on the attachment portion 202 of the support. Typically, pin mountings are bigger than the electrical contacts (in this case one of the concentric rings 111 shown in FIG. 5b) it they arranged to contact. If the pins were arranged in a line extending radially from the centre of the contact surface of the probe body 9, the size of the pins would limit the radial packing of the concentric rings on the contact surface of the support. By arranging the pins in a spiral formation, as shown in FIG. 5a, the concentric rings on the support can be packed closer together than if they were arranged in a radial line. Other non-spiral arrangements can also achieve this advantage.

The pins 108 are spring loaded so that they make electrical contact with the contacts provided on the support without influencing the location of the surface sensing device with respect to the support.

Figure 5B:
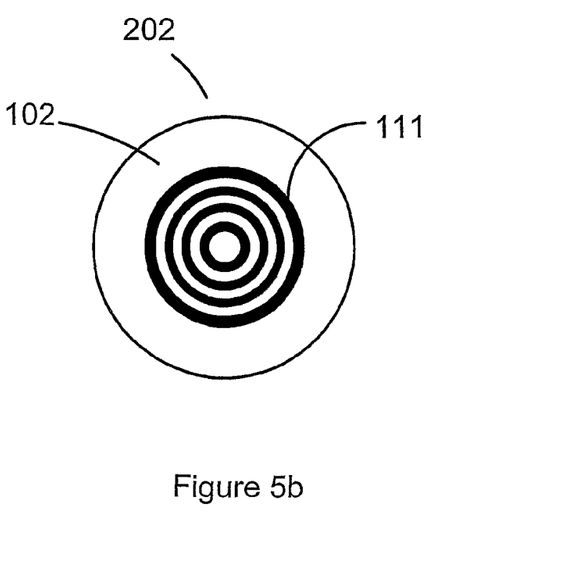
FIG. 5b shows a plan view of the attachment means and electrical connections provided on the support.

FIG. 5b shows a plan view of the attachment means and electrical connection means provided on the support. Concentric rings 111 of electrical connector material are arranged on the connecting surface of the attachment portion 202. A ring of magnetic material 102, such as ferrous material, is provided around the circumference of the connecting surface of the attachment portion 202 to connect with the magnets 101 on the probe body 9.

The arrangement of the electrical connections allows the surface sensing device 4 to be connected to the attachment portion 202 of the support at any rotational orientation.

In order to change the orientation of the stylus tip 5 with respect to the support 7 (see FIG. 1), a number of steps are carried out. A preferred embodiment of the method according to the present invention is described with reference to FIGS. 3 and 4.

Firstly the longitudinal axis 4A of the surface-sensing probe 4 is aligned with the rotational axis 1A of the first housing member 1 of the support 7 by rotation about the second axis of rotation (2A). The device is then moved into the probe change port 70 by the moveable arm of the machine (not shown) to which the support is attached. The probe change port 70 is able to hold surface sensing device; it is fitted with a lip 71 which engages with a groove 104 on the surface sensing device 4 as it is moved into the probe change port 70. The lip 71, cooperating with the groove 104, holds the surface sensing device 4 stationary whilst the moveable arm of the machine pulls the support 7 away from the surface sensing device 4, against the magnetic force which attaches the surface sensing device 4 and the support 7 together. The support 7 and the surface sensing device 4 are thus disconnected.

In the next step of the method the motor M1 rotates the first shaft 20 of the support 7 relative to the stationary surface sensing device 4, about the first axis 1A. As the second housing member 2 is attached to the first shaft 20, this too is caused to rotate relative to the stationary surface sensing device 4 about the first axis 1A.

The movement of the support 7 about its first axis 1A, relative to the surface sensing device 4, can be measured using positioning measuring means such as encoders which may already be provided in the support 7.

Once the support 7 has been rotated relative to the surface sensing device 4 by a desired amount, the moveable arm of the machine moves the support back towards the probe change port 70 and into contact with the surface sensing device 4. The magnets provided on the surface sensing device 4 re-engage with the magnetic material on the support 7 such that the orientation of the surface sensing device 4 is fixed relative to the support 7.

Once the support 7 and surface sensing device 4 have been reconnected the whole device is driven away from the probe change port 70 by the moveable arm of the machine. The surface sensing device 4 can then be moved to a desired orientation using the first and second motors M1 and M2 of the support 7, before being used to measure the surface of a workpiece.

By following a method of the present invention the stylus tip 5 can be orientated at different angles about the longitudinal axis of the probe 4A with respect to the support 7, enabling the surface-sensing probe 4 to reach a greater variety of surfaces.

Figure 6A:
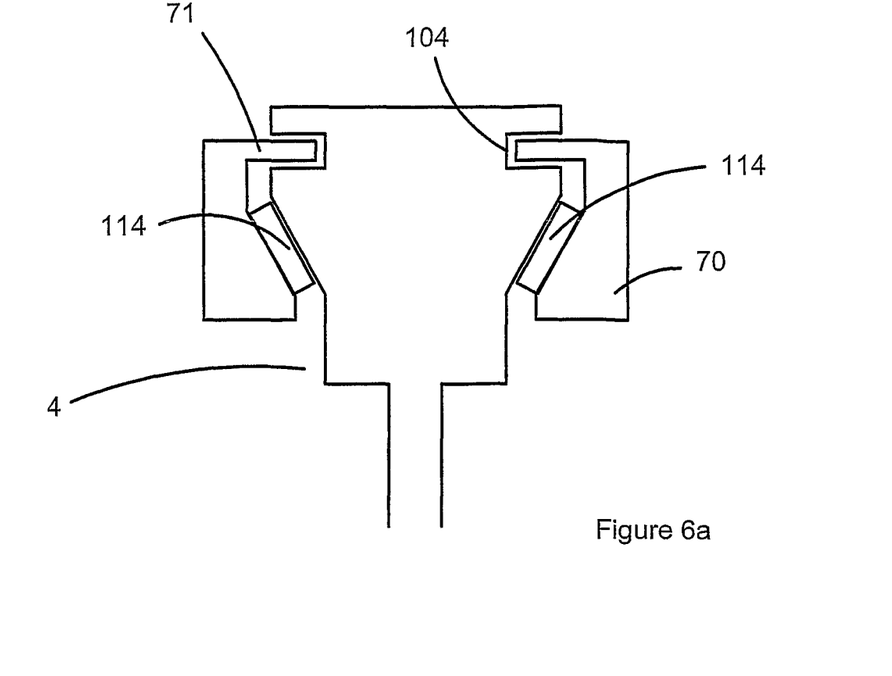
FIG. 6a show a cross-section through the surface sensing device and the probe change port of an alternative embodiment of the invention.
Figure 6B:
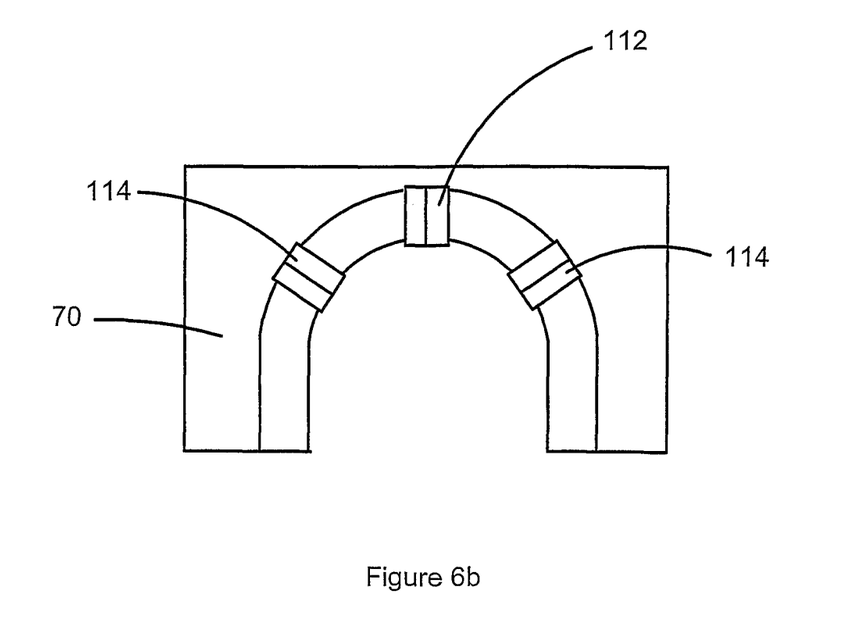

FIG. 6a show a cross-section through the surface sensing device 4 and the probe change port 70 of an alternative embodiment of the invention; and FIG. 6b shows a plan view of the probe change port 70 shown in FIG. 6a. In this alternative embodiment the surface sensing device 4 may be rotated in the probe change port (or holder) 70 by a motorised roller 112, and other rollers 114 provided on the probe change port 70; here, instead of the support being rotated relative to the surface sensing device 4, the surface sensing device 4 is rotated relative to the support. In this embodiment the rotation of the surface sensing device 4 may be measured indirectly, for example using a scale and a vernier, one provided on the stationary holder and the other on the moveable surface sensing device 4. In this case a viewing camera, either in the port or separate to the port, may be used to assess the angle rotated by the support relative to the surface sensing device, or the angle rotated may be assessed by alternative encoding means, e.g. an encoder attached to one of the alternative support rollers could monitor that angle of rotation achieved.

The surface-sensing device 4 may be for example a contact probe, or a non-contact probe. Contact probes include, for example, surface finish probes as mentioned previously. Non-contact probes include, for example, optical, capacitance and inductance probes.

In particular, the invention is useful for single axis probes such as optical probes and surface finish probes. This is because for these types of probes especially, the ability to change the relative orientation of the surface sensing device and the support greatly increases the number of surfaces the probe can access. Changing the relative orientation of the surface sensing device and the support as discussed with reference to the present invention is also particularly useful for laser line probes as it is possible to effectively rotate the laser line about the longitudinal axis 4A of the surface sensing device.

Figure 7:
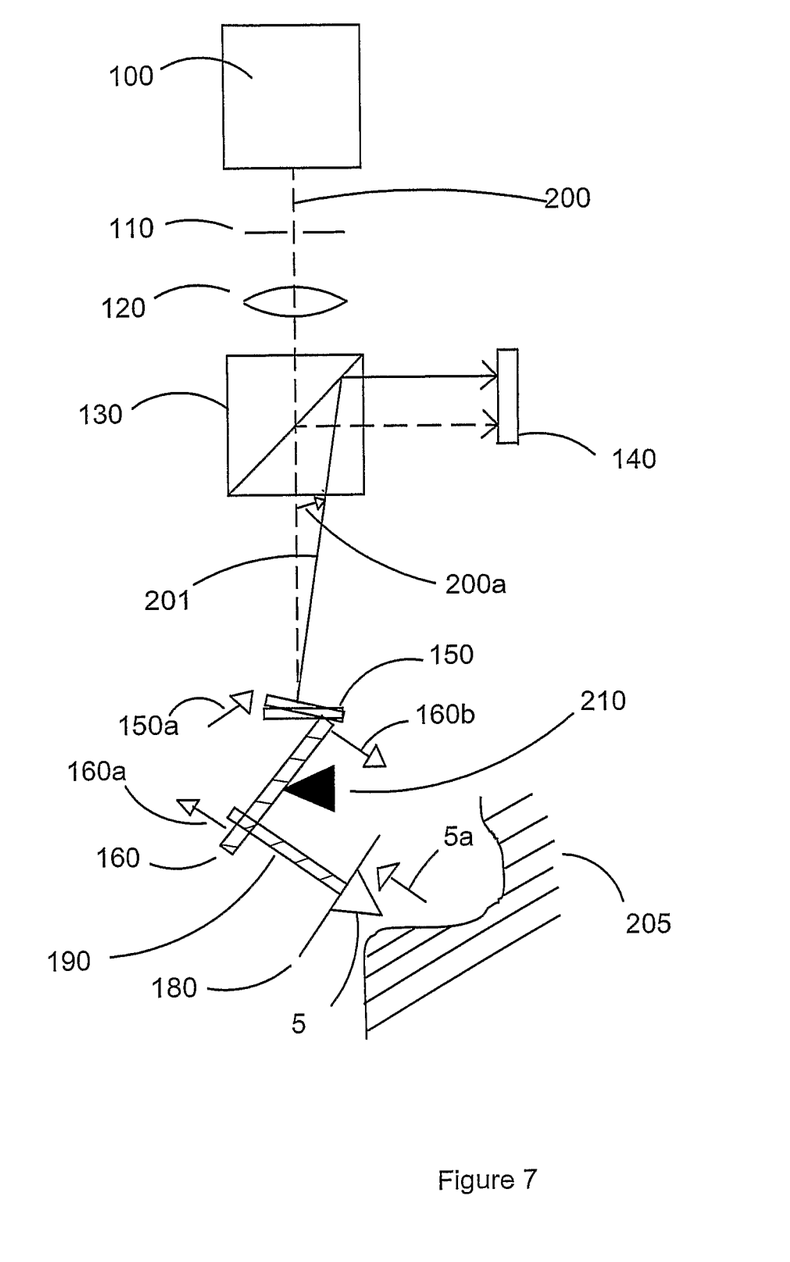
FIG. 7 shows a schematic diagram of the internal workings of a surface finish probe.

FIG. 7 shows a schematic diagram of a surface finish probe. A laser 100 in the probe body 9 directs a beam 200 towards a mirror 150. The beam 200 passes through an aperture 110 and a lens 120 into a beam splitter 130. The beam 200 passes through the beam splitter 130 and onto the mirror 150, the beam is reflected off the mirror and back to the beam splitter 130, where it is then directed towards a photo sensitive diode (PSD) 140. The mirror 150 is connected to the proximal end of a lever 160, which is balanced on a fulcrum 210. At its distal end the lever 160 is connected to one end of a stylus stem 190 which is connected at its other end to the stylus tip 5. A skid 180 rests along either side of the tip. The stylus tip 5 is preferably a diamond tip, as it needs to be hard wearing to not break as it is dragged along a surface.

Figure 9:
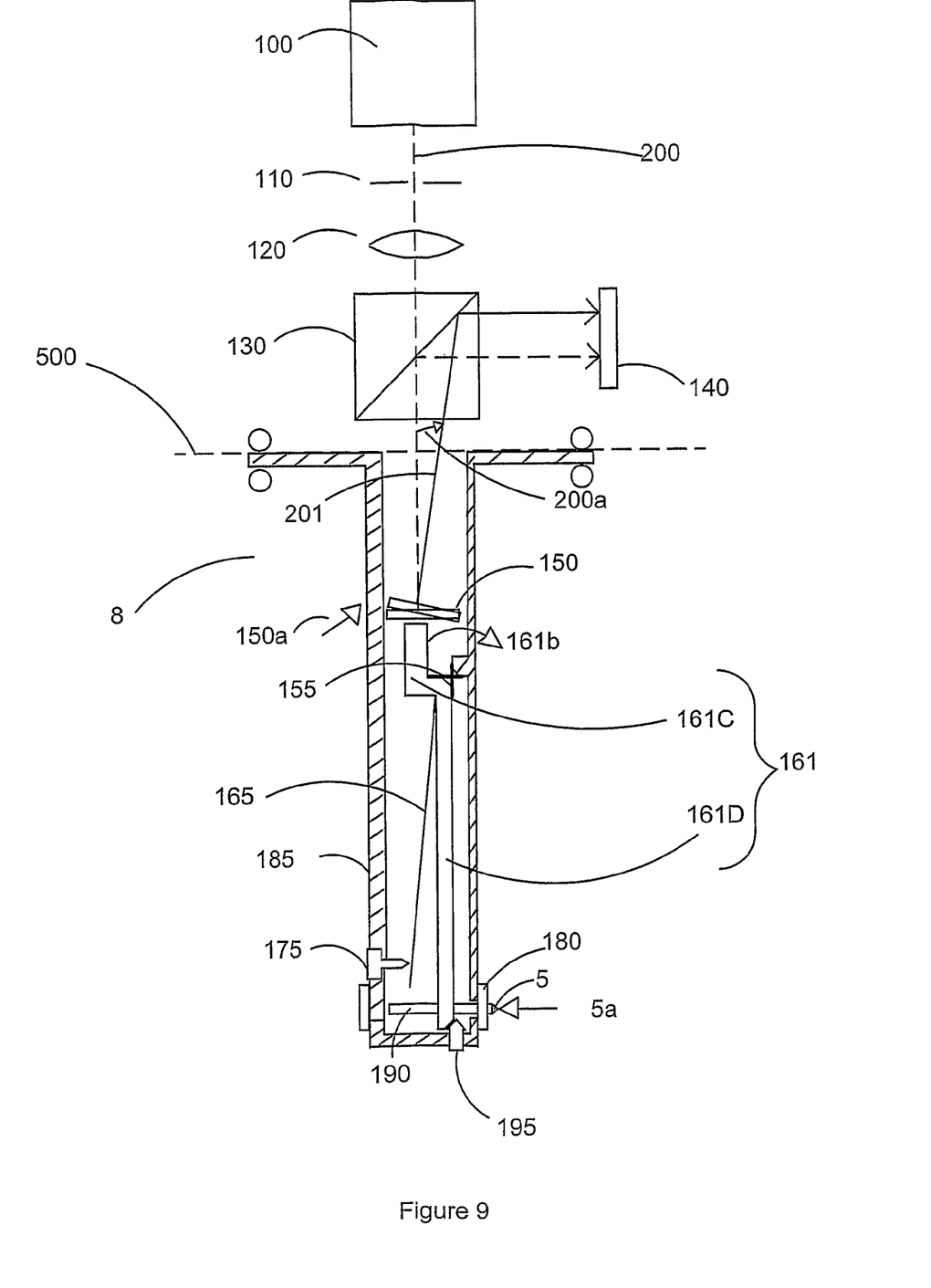
FIG. 9 shows a schematic diagram of the internal workings of an alternative surface finish probe.

FIG. 9 shows a schematic diagram of an alternative surface finish probe. The stylus 8, housed by housing 185, is detachable from the probe head along line 500. The lever 161 is fixed with respect to the housing of the stylus 185 by 2 crossed flat springs 155. When the stylus tip 5 contacts the surface of a workpiece the stylus tip 5 will be pushed back into the housing of the stylus. This movement causes the lever 161 to rotate about the pivot point where the cross springs meet, in turn the mirror is caused to move. A screw 175 can be tightened to apply pressure to another spring 165 which urges the stylus tip 5 towards the workpiece. The stylus tip 5 typically protrudes up to 100 microns from the edge of the skid 180. A screw 195 is provided adjacent to the lever 161 to adjust the amount that the stylus tip 5 protrudes from the edge of the skid 180.

Figure 10:
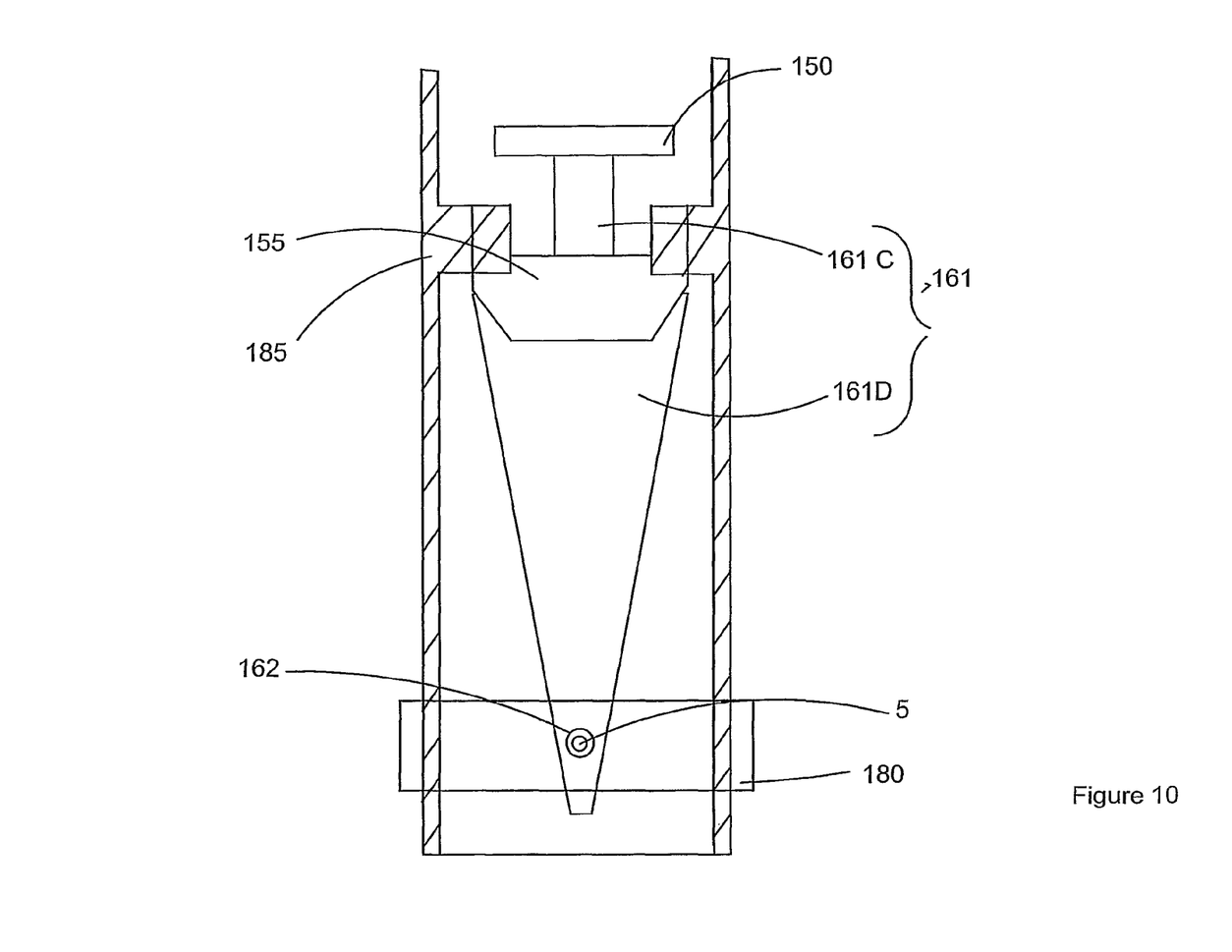
FIG. 10 shows a plan cross-sectional view of the alternative surface finish probe as shown in FIG. 9.

FIG. 10 shows a plan cross-sectional view of the alternative surface finish probe as shown in FIG. 9. The lever 161 has 2 sections, a first section 161C which is provided proximal to the mirror 150, and a second section 161D which is provided proximal to the stylus tip 5. The second section 161D is triangular in shape so as to minimise sideways movement of the lever and thus the stylus tip 5 (which protrudes from the stylus through a hole 162 in the skid 180).

As the surface-sensing device is moved along the surface of a workpiece the skid 180 follows the rough contour (surface waviness) of the surface whilst diamond tip 5 follows the detailed surface texture of the surface. As the diamond tip 5 is displaced by the surface of the workpiece the position of the lever 160 varies, as does the position of the mirror 150. As the mirror moves, the laser beam directed towards it is reflected at a different angle, and as a consequence the laser spot on the PSD is moved, as shown in FIG. 7. In this way the profile of the surface of the workpiece can be measured. In FIGS. 7 and 9, the movement of the diamond tip 5 as it moves over the workpiece surface 205, and the resulting movement of the lever, mirror, and beam is shown by arrows 5a, 160a, 160b, 150a and 200a. The deflected path of the beam between the mirror and the PSD is shown by line 201.

In a preferred embodiment, the skid is fixed relative to the probe stylus, and the probe stylus is stiff. As the surface-sensing device is dragged along a surface, the stiff stylus and fixed skid allow the surface-sensing device to be pushed towards the surface with a substantially constant torque.

In an alternative embodiment the stylus may be deflectable and the skid moveable; in this case the deflection of the stylus can be transduced to determine the skid's contact with the workpiece surface.

Figure 8A:
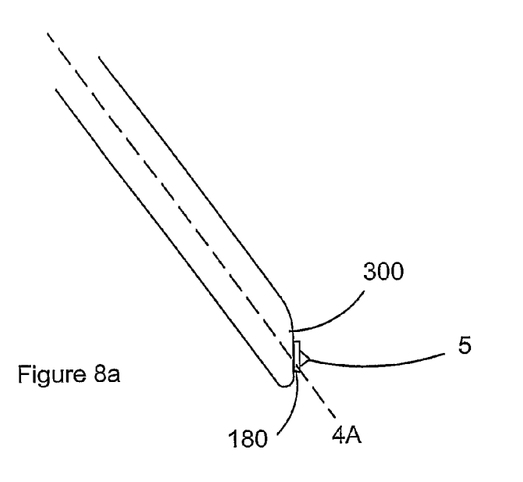
FIGS. 8a, 8b, 8c, and 8d show four embodiments of the orientation of the stylus tip and stylus face of the surface finish probe.
Figure 8B:
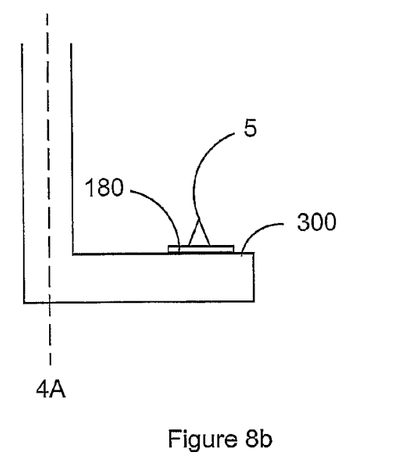
Figures 8C, 8D:
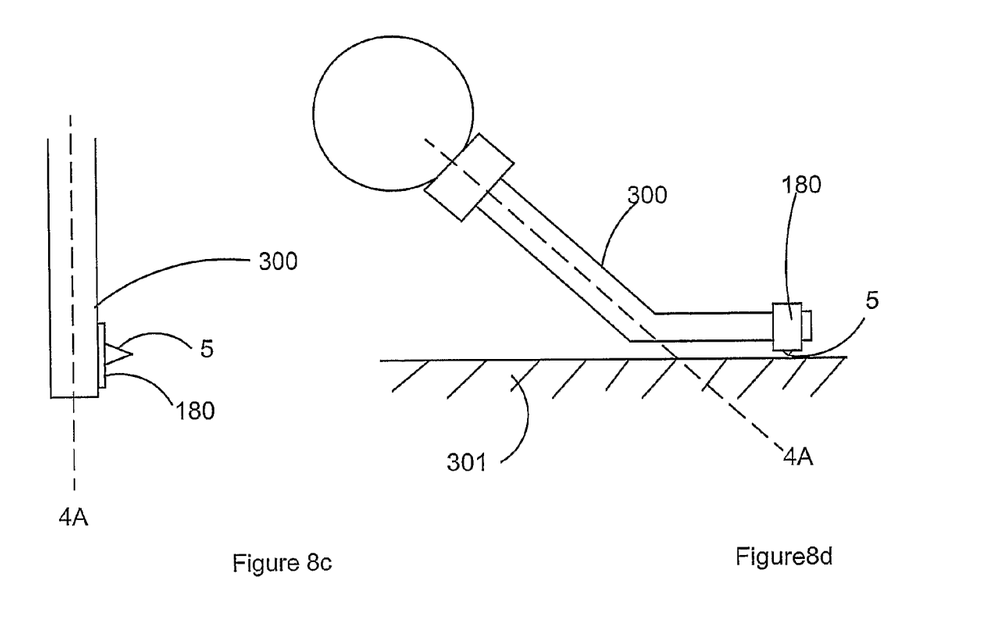

FIGS. 8a, b, c, and d show four embodiments of the orientation of the stylus tip 5 and stylus face 300 of the surface-sensing device (the surface finish probe). The stylus tip 5 is perpendicular to the skid 180, and to the face of the stylus 300. The face of the stylus 300 and thus the stylus tip 5 may be provided at an angle to the longitudinal rotational axis of the probe 4A, as shown in FIG. 8a, to aid the stylus tip 5 when moving into large holes. As shown in FIG. 8b the face 300 of the stylus may alternatively be provided at 90 degrees to the longitudinal rotational axis of the probe 4A in order to inspect under a workpiece; in this case the stylus tip 5 lies parallel to the longitudinal rotational axis of the probe. In a third embodiment, as shown in FIG. 8c, the stylus face 300 may be provided parallel to the longitudinal rotational axis of the probe 4A. In this case the stylus tip 5 is perpendicular to the longitudinal rotational axis of the probe, improving accessibility of the inside surface of small bored holes.

In a fourth embodiment as shown in FIG. 8d the stylus is cranked at a non-90 degree angle. The stylus tip 5 points in a direction transverse to the longitudinal axis of the probe 4A. When sensing the surface of a workpiece the stylus tip 5 must point in a direction perpendicular to the surface 301. Due to certain restrictions on the movement of the articulating probe head, and the size of the articulating probe head, it is not possible to achieve the described perpendicular sensing arrangement with a straight stylus as shown in FIG. 8c. The cranked stylus of FIG. 8d allows the stylus tip to be positioned so that the probe head clears the surface, and thus allows the stylus tip 5 to access a greater number of surfaces from a perpendicular position.

Figure 11:
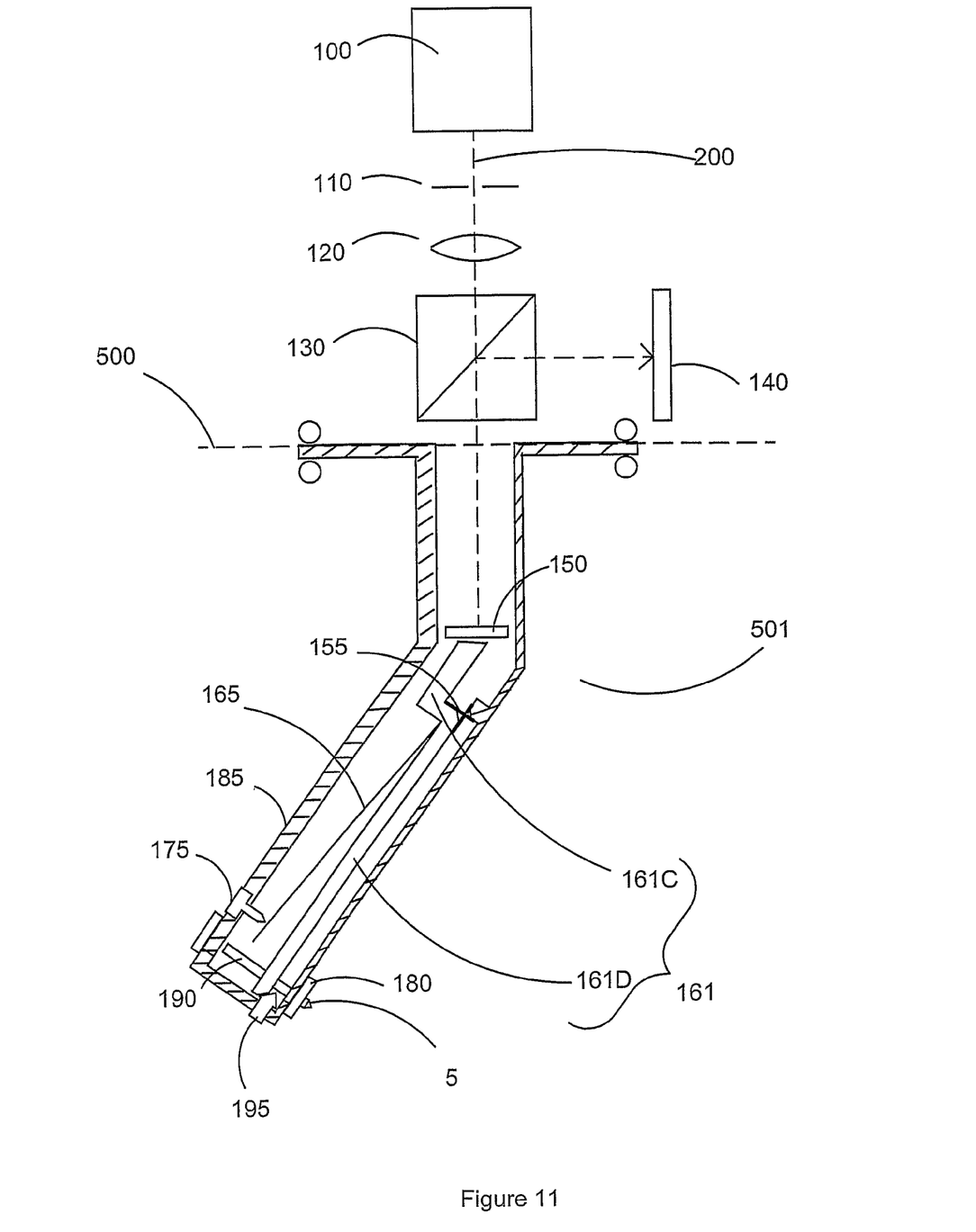
FIG. 11 shows a schematic diagram of a surface finish probe having a cranked stylus, as shown for a straight stylus in FIG. 9.

FIG. 11 shows a schematic diagram of a surface finish probe with a cranked stylus. This is similar in many ways to the stylus shown in FIG. 9 where similar reference numerals denote similar parts. The stylus 501, housed by housing 185, is detachable from the probe head along line 500. The lever arrangement is provided in the cranked portion of the stylus whilst the light path arrangement is provided in the straight part of the stylus. The mirror is provided at the interface between the two parts at an angle so as to return the optical beam to the beam splitter in a similar way to that of the straight stylus. This means that the cranked stylus can use the same optics and thus the same probe mount as used by the straight stylus.

In general the stylus face 300 and stylus tip 5 may be provided at any angle, with respect to the longitudinal rotational axis of the probe, for convenience of workpiece surface access.

If, for example, the probe tip is aligned with the longitudinal axis of the surface-sensing device, the probe has no advantage with respect to access when rotated about the longitudinal axis of the surface sensing device. Consequently, to benefit from the advantage of increased accessibility of workpiece surfaces by rotating the surface-sensing device about its longitudinal axis, the probe tip must be transverse to or offset from said longitudinal axis.

The invention claimed is:

1. A method for orienting a surface sensing device using an apparatus that includes a support attachable to a moveable arm of a machine, the support a first member rotatable about a first axis of rotation, a surface sensing device for sensing the surface of a workpiece, the surface sensing device being releasably connectable, directly or indirectly, to the first member for rotation therewith, the method comprising:
   disconnecting the surface sensing device from the first member of the support, said surface sensing device being connected to the support in a first orientation;
   rotating the first member of the support relative to the surface sensing device; and
   reconnecting the surface sensing device and the first member of the support into a second orientation.

2. The method according to claim 1, wherein the method further comprises the step of holding the surface sensing device in a holder when it is disconnected from the first member of the support.

3. The method according to claim 2, wherein the moveable arm of the machine moves the surface sensing device into the holder.

4. The method according to claim 1, wherein rotation of the first member of the support relative to the surface sensing device is about the first axis of rotation.

5. The method according to claim 4, wherein rotation of the first member of the support relative to the surface sensing device is effected by a first motor.

6. The method according to claim 1, wherein the step of reconnecting the first member of the support and the surface sensing device comprises moving the moveable arm of the machine such that the first member of the support is brought into connection with the surface sensing device.

7. The method according to claim 1, wherein the method further comprises the step of measuring or scanning the surface of a workpiece.

8. The method according to claim 1, wherein the surface sensing device is a surface finish probe.

9. The method according to claim 1, the method being executed using an apparatus that includes a support attachable to a moveable arm of a machine, the support including a first member rotatable about a first axis of rotation, and a second member rotatable about a second axis of rotation, wherein the second member is attached to the first member, and wherein the second axis of rotation is transverse to the first axis of rotation, and a surface sensing device for sensing the surface of a workpiece, the surface sensing device being releasably connectable, directly or indirectly, to the first member for rotation therewith.

10. An apparatus for orienting a surface sensing device comprising:
a support attachable to a moveable arm of a machine, the support including a first member rotatable about a first axis of rotation, and a second member rotatable about a second axis of rotation, wherein the second member is attached to the first member, and wherein the second axis of rotation is transverse to the first axis of rotation; and
a surface sensing device for sensing the surface of a workpiece, the surface sensing device being releasably connectable, directly or indirectly, to the first member for rotation therewith, the surface sensing device being releasably connectable to the first member in at least two relative rotational orientations, and the surface sensing device being disconnectable from a first rotational orientation relative to the support and reconnectable in a second rotational orientation relative to the support.

11. The apparatus according to claim 10, wherein electrical contacts are provided on both the surface sensing device and the support, the electrical contacts being configured to relay electrical signals from the surface sensing device to the support in the at least two rotational orientations of the surface sensing device with respect to the support.

12. The apparatus according to claim 11, wherein the electrical contacts include concentric rings of electrical contact material on at least one of the surface sensing device and the support.

13. The apparatus according to claim 12, wherein the electrical contacts include pins of electrical contact material on the other of the surface sensing device and the support.

14. The apparatus according to claim 11, wherein the electrical contacts include a gold plated substrate.

15. The apparatus according to claim 10, wherein rotation of the first member of the support about the first axis of rotation is actuated by a first motor.

16. The apparatus according to claim 10, further comprising:
a holder for holding the surface sensing device when it is disconnected from the first member of the support.

17. The apparatus according to claim 16, wherein the holder includes holding means which assist in disconnecting the surface sensing device from the support.

18. The apparatus according to claim 10, wherein the surface sensing device is releasably attached to the support by attachment means including: (1) at least one magnet on one of the support and the surface sensing device and (2) at least one magnetic material on the other of the support and the surface sensing device.

19. The apparatus according to claim 10, wherein the surface sensing device has a substantially longitudinal axis and senses a surface in a direction transverse to or offset from said substantially longitudinal axis.

20. The apparatus according to claim 10, wherein the surface-sensing device includes a probe body, a stylus, and a stylus tip.

21. The apparatus according to claim 10, wherein the surface-sensing device includes a surface finish probe.

* * * * *